United States Patent [19]

Park

[11] Patent Number: 5,388,094
[45] Date of Patent: Feb. 7, 1995

[54] TURNTABLE BRAKE FOR A DISC PLAYER

[75] Inventor: Joong-Je Park, Incheon, Rep. of Korea

[73] Assignee: Daewoo Electronics Co., Ltd., Seoul, Rep. of Korea

[21] Appl. No.: 119,337

[22] Filed: Sep. 9, 1993

[30] Foreign Application Priority Data

Sep. 9, 1992 [KR] Rep. of Korea ............... 92-17238

[51] Int. Cl.$^6$ ............................................. G11B 17/028
[52] U.S. Cl. ............................. 369/270; 369/268; 360/99.08
[58] Field of Search ............. 360/99.08, 99.12, 99.04, 360/99.05, 98.07, 98.08; 369/263, 264, 266, 234, 235, 232, 268, 270, 79; 192/18 B, 84 PM; 242/198

[56] References Cited

U.S. PATENT DOCUMENTS

| | | | |
|---|---|---|---|
| 3,343,636 | 9/1967 | Donelan et al. | 192/18 B |
| 3,803,351 | 4/1974 | Pedersen et al. | 369/268 |
| 3,936,056 | 2/1976 | Breyfogle, III et al. | 369/268 |
| 4,477,894 | 10/1984 | Clurman | 369/270 |
| 4,485,465 | 11/1984 | Kirschner | 369/268 |
| 4,562,563 | 12/1985 | Arets et al. | 369/268 |
| 5,040,164 | 8/1991 | Liu | 369/268 |

Primary Examiner—Robert S. Tupper
Assistant Examiner—William R. Korzuch
Attorney, Agent, or Firm—William F. Pinsak

[57] ABSTRACT

The present invention relates to a turntable brake for a disc player capable of preventing a turntable from rotating when a disc is improperly loaded on the turntable. In accordance with the invention, the turntable brake which employs first and second magnets is provided. When the disc is correctly loaded on the turntable, two magnets are directly contacted with each other, thereby permitting the rotation of the turntable. When the disc is improperly loaded on the turntable, two magnets are separated from each other, thereby preventing the turntable from rotating.

4 Claims, 5 Drawing Sheets

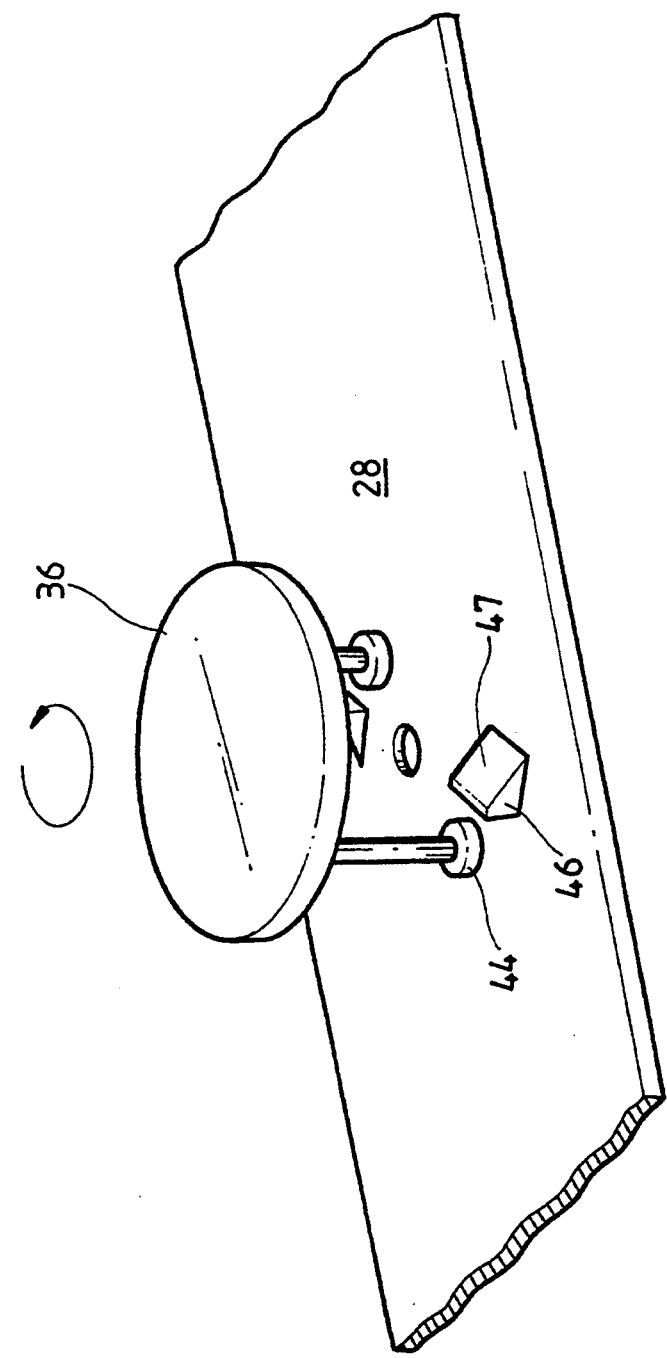

TURNTABLE BRAKE FOR A DISC PLAYER

FIELD OF THE INVENTION

The present invention relates to a turntable brake for a disc player; and, more particularly, to a turntable brake which is capable of preventing the turntable from rotating when a disc is improperly loaded on the turntable.

DESCRIPTION OF THE PRIOR ART

Conventional disc players, e.g., a compact disc player, a laser disc player and a multi-disc player, have a disc loading mechanism including a housing, a turntable which is rotatably journalled about its vertical axis to rotate a disc in the housing, and a disc clamping arrangement which biases the disc against the turntable in order to ensure that the disc is accurately rotated without any irregularity.

One of the such prior art disc players is disclosed in U.S. Pat. No. 4,607,361 issued to Pieter D. Schuitmaker et al., which has a pivotable pressure lever with a disc loader. The pressure lever is pivoted about a horizonal axis perpendicular to the direction of movement of a drawer. A disc is centered on the centering cone and disposed on a turntable, and the disc loader carried by the main part of the pressure lever urges the disc against the turntable. As a result, the drawer and the pressure lever operate to have the disc slidably and accurately loaded along a defined path and move to the turntable in a correct position.

U.S. Pat. No. 4,701,901 issued to Nobuo Imai discloses another type of disc player which comprises a clamp plate having a pressure contact portion urged by a plate spring. The pressure contact portion has a guide pin which extends downwardly from its center and a sleeve which extends downwardly from its edge in concentrical relationship with the guide pin. The turntable has an annular protrusion for defining a groove through which the guide pin is vertically movable, and insertable between the guide pin and sleeve. Accordingly, the disc loaded between the sleeve and the turntable may be positively pressed against the turntable by a biasing force of the plate spring and a guiding function of the guide pin.

While the prior art disc players, which employ the pivotable pressure lever or the disc clamping plate, are capable of performing their assigned task, other problems still exist. For example, when the disc is improperly loaded on the turntable, the turntable may be driven with the disc being depressed by the clamping plate in an incorrect position so that the information bearing surface may be damaged. In addition, the irregular rotation of the disc can cause the optical pick-up to read the information incorrectly.

SUMMARY OF THE INVENTION

Accordingly, it is an object of the invention to provide a disc player which employs a turntable brake capable of preventing the turntable from rotating when the disc is improperly located onto the turntable.

It is another object of the invention to provide a disc player which is set to operate in an eject mode when the turntable is stopped by the turntable brake.

The above and other objects of the present invention are accomplished by means of a turntable brake adapted to a disc player having a disc loading device which includes a disc presser having a rotatable clamp plate and fixed to a main body, a spindle motor fixed to a panel and having a shaft, a turntable fixed to the shaft of the spindle motor to be rotated therewith, and a tray on which a disc is seated to be loaded on the turntable, said turntable brake comprising: a first magnet which is vertically movable along a groove formed on an annular protrusion of the turntable; a brake member fixed to the first magnet and having a pair of legs, each of which has a stopper, vertically movable through a pair of holes of the turntable; a second magnet inwardly fixed to a groove formed on the rotatable clamp plate; a pair of wedge-like lugs upwardly protruding from the panel and having a height higher than the elevation of said stoppers where they are originally positioned; and means for ejecting the disc when the rotation of the spindle motor is stopped by the brake member.

BRIEF DESCRIPTION OF THE DRAWINGS

The above and other objects, advantages and features of the present invention will be apparent from the following descriptions, taken in conjunction with the accompanying drawings wherein:

FIG. 5 is an enlarged perspective view of the brake member and the wedge-like lugs protruding from the panel.

DETAILED DESCRIPTION OF THE PREFERRED EMBODIMENTS

Figure 1:
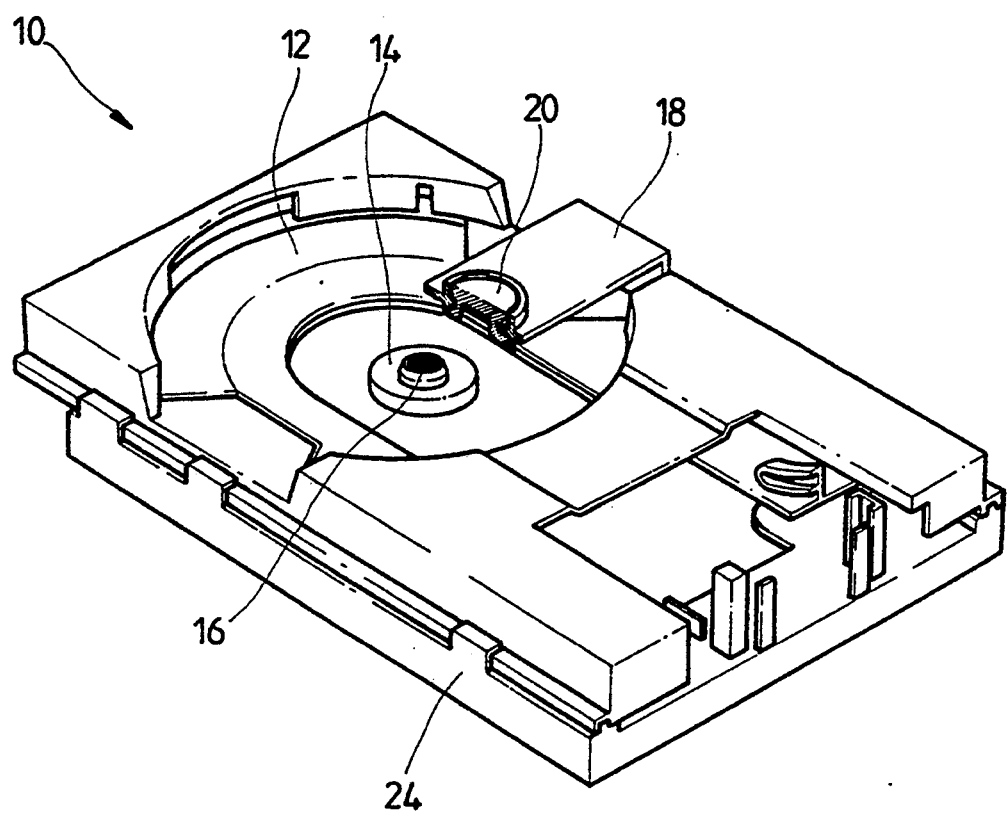
FIG. 1 is a perspective view of a disc player in accordance with the present invention.
Figure 2:
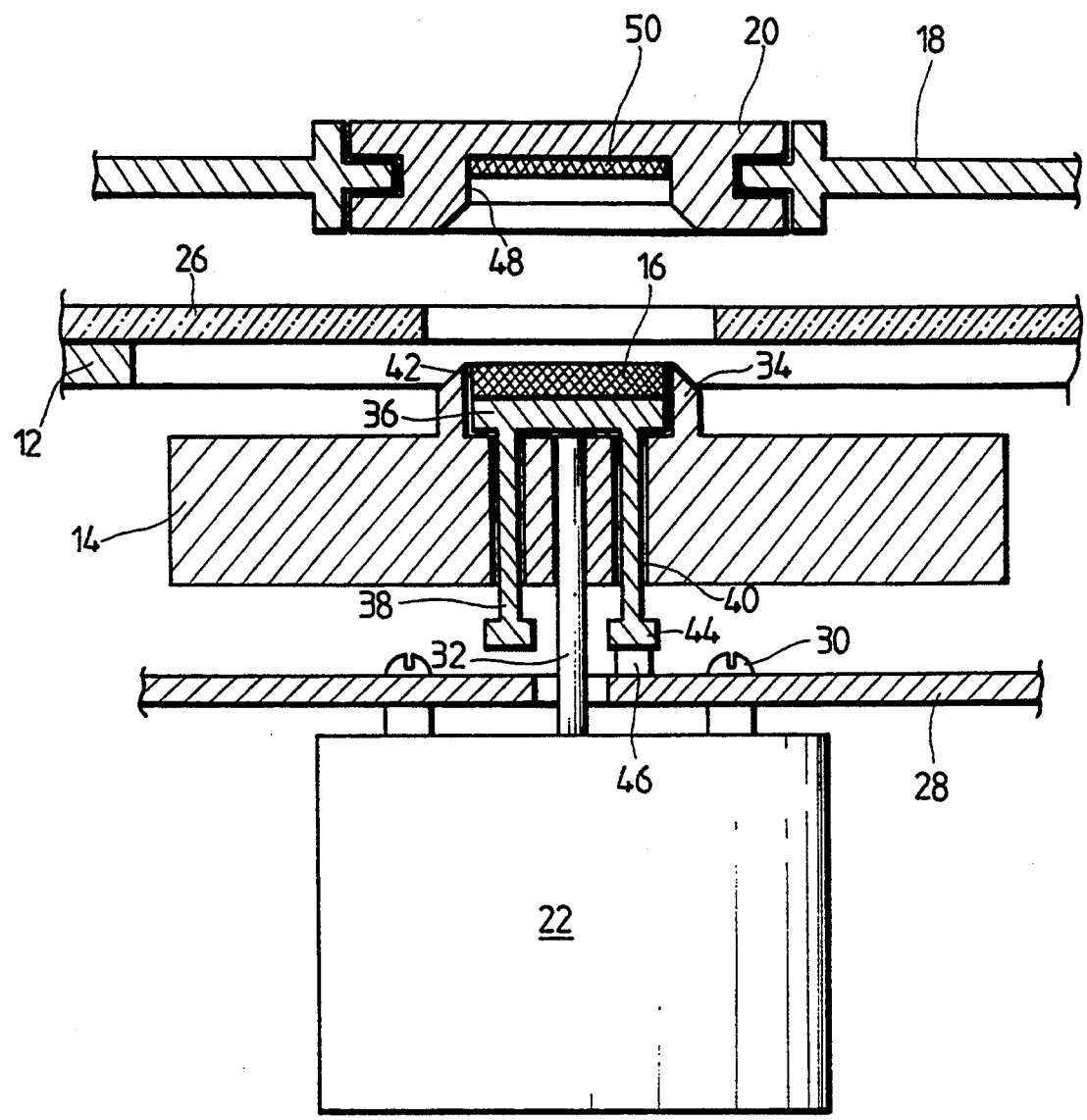
FIG. 2 is an enlarged cross-sectional view of the disc player, with a disc on a tray being located above the turntable.

Referring first to FIG. 1, there is shown a front loading device 10 incorporated in a disc player. The front loading device, which is slidably movable between a disc loading position and a disc unloading position, includes a tray 12 on which a disc 26 (shown in FIG. 2) is seated for loading onto a turntable 14 having a first magnet 16 therein, a disc presser 18 having a rotatable clamp plate 20, and a turntable 14 fixed to a spindle motor 22 (FIG. 2). The disc presser 18 is fixed to a main body 24. The turntable 14 through which the first magnet 16 slidably moves is not raised until the disc 26 on the tray 12 reaches a point above the turntable 14. The turntable 14 moves upward and downward together with the spindle motor 22 and a panel 28(shown in FIG. 2), to which the spindle motor 22 and an optical pick-up (not shown) are fixedly attached, as the tray 12 moves forward and backward.

FIG. 2 illustrates an enlarged cross-sectional view of the disc player, with a disc 26 on the tray 12 being located above the turntable 14, just before the turntable 14 is raised in the upward direction for disc loading. The spindle motor 22, which is fixedly linked to the panel 28, e.g., by a number of screws 30, has a shaft 32 fixed to the turntable 14. The turntable 14 is a circular-shaped plate having an annular protrusion 34, forming a groove 42, through which the first magnet 16 and a brake member 36, fixed to the first magnet 16, slidably move upward and downward. The brake member 36 has a pair of legs 38, slidably moving through a pair of holes 40 formed in the turntable 14, each of which has a distal end forming a pair of stoppers 44 for preventing the first magnet 16 and the brake member 36 from being released or detached from the turntable 14 during the disc unloading, at which time the tray 12 is moved backward and the turntable 14 is lowered. Protruding from the panel 28 is a pair of wedge-like lugs 45 (only one of the lugs is visible as they are located opposite about an imaginary center line drawn by the two stoppers; see, however, FIG. 5) that function to permit or prohibit the rotation of the first magnet 16 and the brake member 36 by releasing or braking the stoppers depending upon their elevational position.

Illustrated at the uppermost is a disc presser 18 having a rotatable clamp plate 20 that serves to depress the disc 26 against the turntable 14. The rotatable clamp plate 20 has a circular groove 48 in which a second magnet 50 is inwardly fixed to the clamp plate 20 to provide a cavity for accomodating the first magnet 16. The tray 12, as shown, loads the disc 26 onto the turntable 14 to be located between the rotatable clamp plate 20 and the turntable 14. Hereinafter, it will be described with reference to the turntable 14 raised to an upper position in order to load and rotate the disc 26.

Figure 3:
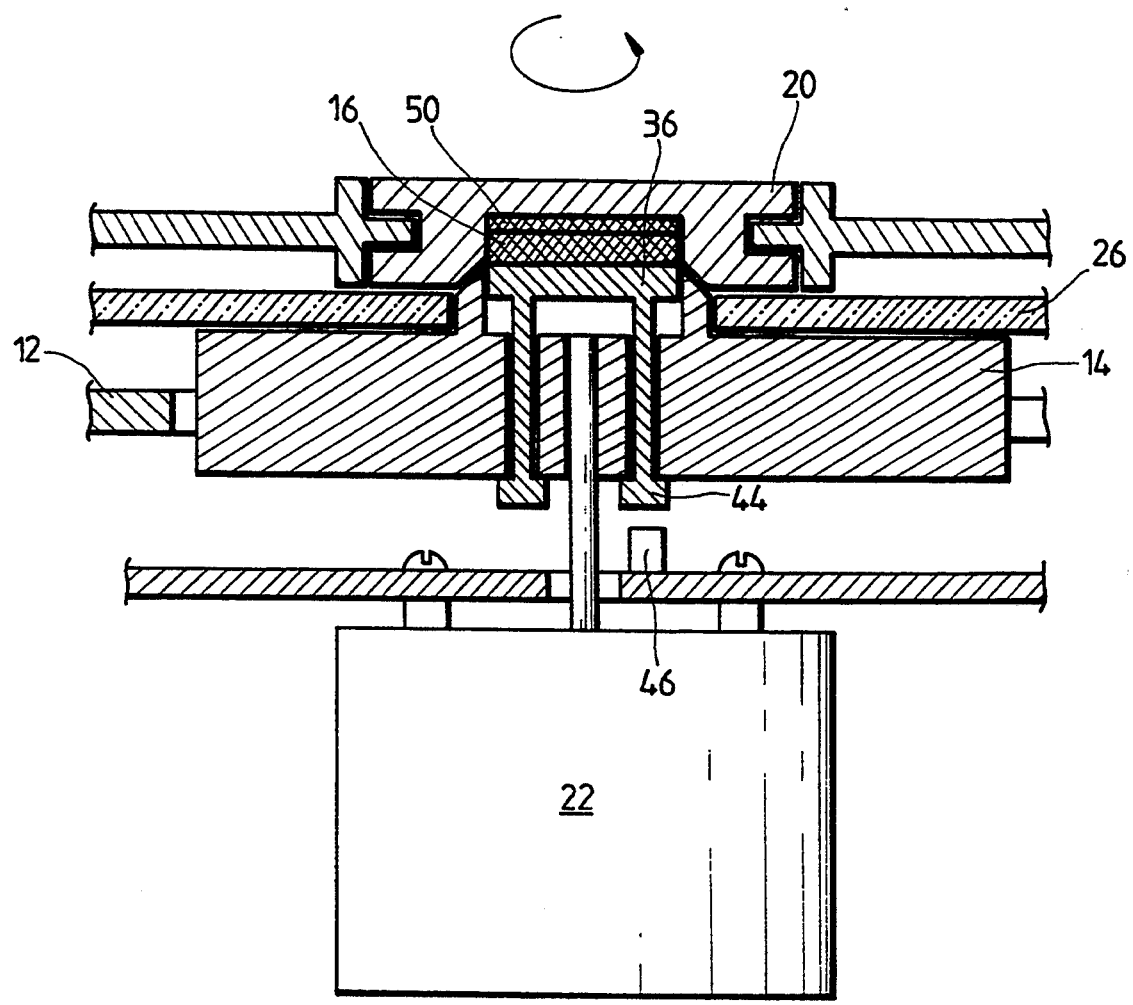
FIG. 3 is an enlarged cross-sectional view of the disc player, with the disc correctly loaded on the turntable.

Referring to FIG. 3, there is shown an enlarged cross-sectional view of the disc player, with the disc 26 correctly loaded on the turntable 14. As illustrated, the first and the second magnets 16, 50 are directly contacted by the attraction force between them; and, as a result, the stoppers 44 of the brake member 36 are lifted over the lugs 46 to permit the rotation of the turntable The attraction force between the two magnets 16, 50 ensures that the disc 26 is closely sandwiched between the clamp plate 20 and the turntable 14 so that the disc 26 is rotated in the direction of an arrow without any irregularity.

Figure 4:
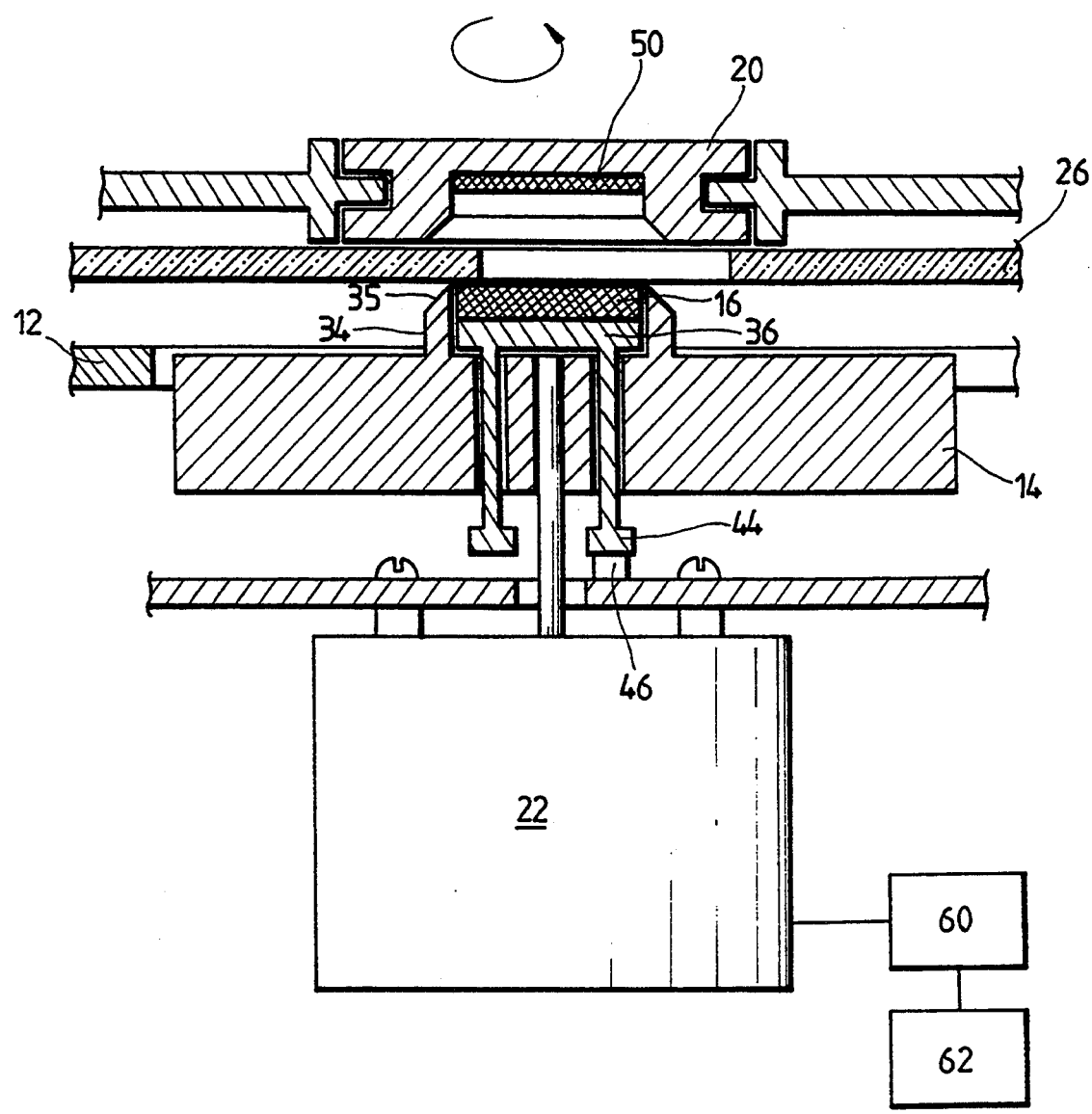
FIG. 4 is an enlarged cross-sectional view of the disc player, with the disc improperly loaded on the turntable and the turntable raised to load the disc.

Turning now to FIG. 4, there is shown an enlarged cross-sectional view of the disc player, with the disc 26 improperly loaded on the first magnet 16 of the turntable 14. As shown, since the disc 26 is incorrectly loaded toward the right side of the first magnet 16, the upward movement of the first magnet 16 and the brake member 36 will be hindered by the left-side inner edge of the disc 26 causing the stoppers 44 to remain attached to the lugs 46, which will in turn prevent the turntable 14 from rotating. When the spindle motor 22 is prevented from rotating in the direction of the arrow, a frequency detecting sensor 60 will be unable to detect a pulse signal produced from a frequency generating device (not shown). A conventional micom 62 adapted to the disc player is programmed to control the speed of the spindle motor 22 depending upon the frequency of the pulse signal detected by the frequency detecting sensor 60. When no pulse signal is detected by the sensor 60, the disc player will be set in an eject mode. Therefore, in the case the above, the disc player will automatically eject the disc to force the operator to reload the disc 26. During the eject mode, the two magnets 16, 50 will be separated to lower the turntable 14 and the spindle motor 22; and, consequently, the brake member 36 will be lowered to original position, seating the disc 26 on the tray 12, which will then move outward to eject the disc 26.

On the other hand, if the inner edge of the disc 26 does not go beyond the slant 35 of the annular protrusion 34, its incorrect loading position will be automatically corrected by the sliding action between them.

FIG. 5 illustrates an enlarged perspective view the operation of the brake member 36 and the wedge-like lugs 46 protruding from the panel 28, when the disc is improperly loaded. The stoppers 44 of the brake member 36 in its lowered position are located slightly above the panel 28; and, have a randomly spaced angular relationship with the wedge-like lugs 46, i.e., spaced apart from each other between 0 degree and 180 degrees with respect to the direction of the rotation. When the turntable is rotated, with the stoppers 44 and the lugs 46 being spaced apart from each other, the disc 26 on the first magnet 16 will be rotated to the extent of the spaced angle; and then effectively stopped. To avoid even this extra rotation, i.e., the idling, of the turntable 14, it may be preferable to design the disc player in such a manner that the stoppers are fully rotated until they are halted by the lugs, when loading a disc. Further, the lugs 46 preferably have a slant 47 in the direction of the arrow in order to prevent the stoppers 44 from straddling on the lugs 44.

Although the invention has been shown and described with respect to the exemplary embodiments, it should be understood by those skilled in the art that various changes, modifications and additions may be made without departing from the spirit and scope of the invention.

What is claimed is:

1. A disc player incorporating therein a disc loading device which includes a disc presser having a rotatable clamp plate, the disc presser being movably attached to a main body for movement between a loading position and a clamping position, a spindle motor fixed to a panel on the main body and having a shaft, a turntable fixed to the shaft of the spindle motor to be rotated therewith, and a tray for receiving a disc and seating the disc onto the turntable, said tray being movably mounted on the main body for movement between a loading position and a clamping position, characterized by a turntable brake comprising:

a first magnet vertically movable along a groove formed in an annular protrusion of the turntable;
   a second magnet fixed to a groove formed in the rotatable clamp plate;
   a brake member fixed to the first magnet and having a pair of legs, each leg having a stopper, said legs being vertically movable through a pair of holes provided in the turntable, said brake member, legs, and stoppers being vertically movable between a loading position and a clamping position responsive to the first magnet being moved towards the second magnet when the disc presser is moved to its clamping position; and
   at least one lug upwardly protruding from the panel and having a height higher than the elevational position of said stoppers in their loading position so that the turntable cannot rotate.

2. The disc player as recited in claim 1, wherein the first magnet is moved toward the second magnet so that the stoppers of the brake member are lifted above the lug when the disc is properly loaded onto the turntable.

3. The disc player as recited in claim 1, wherein movement of the first magnet is hindered by the disc so that the stoppers of the brake member are halted by the lug, thereby preventing the rotation of the turntable when the disc is improperly loaded onto the turntable.

4. The disc player as recited in claim 1, wherein said lug has a slant in the direction of the rotation of the turntable.

* * * * *